Sept. 14, 1948.  S. W. WARNER  2,449,521
SOLDERING OR WELDING IMPLEMENT
Filed Sept. 26, 1945  2 Sheets-Sheet 1
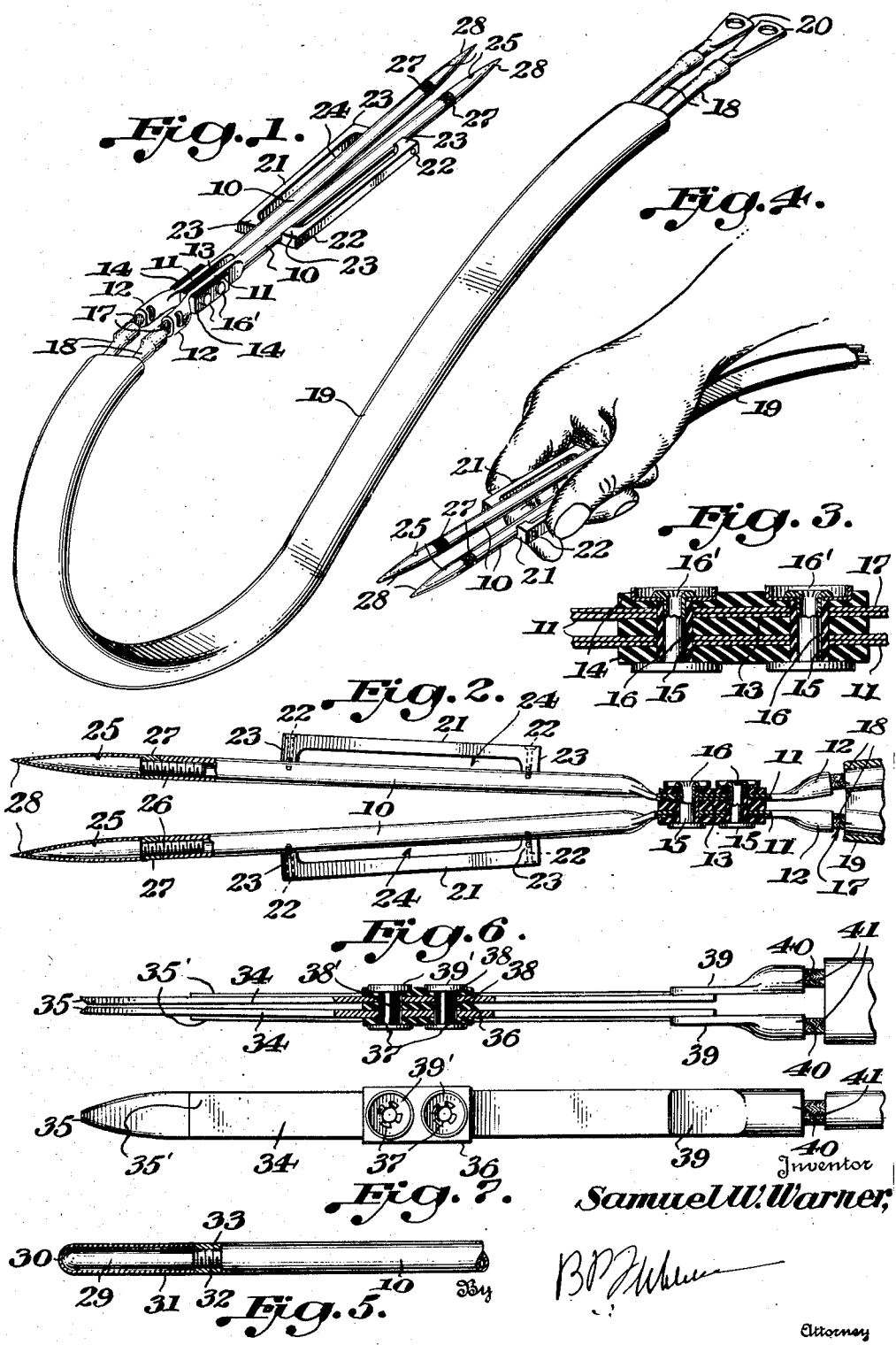
Inventor
Samuel W. Warner,
Attorney

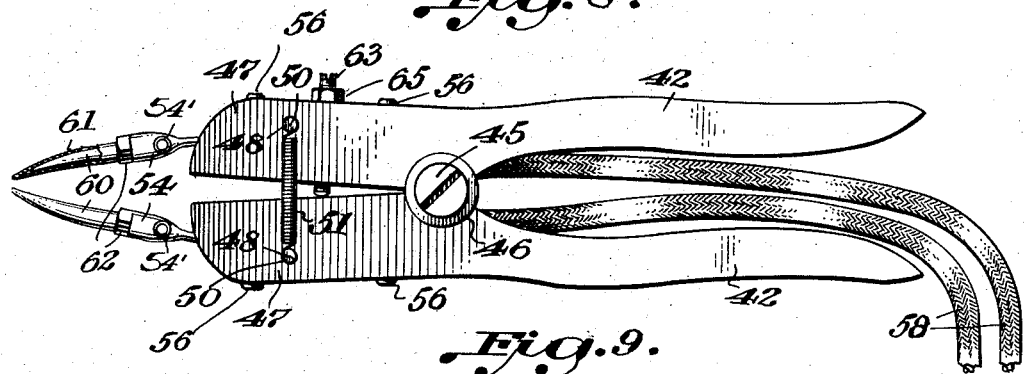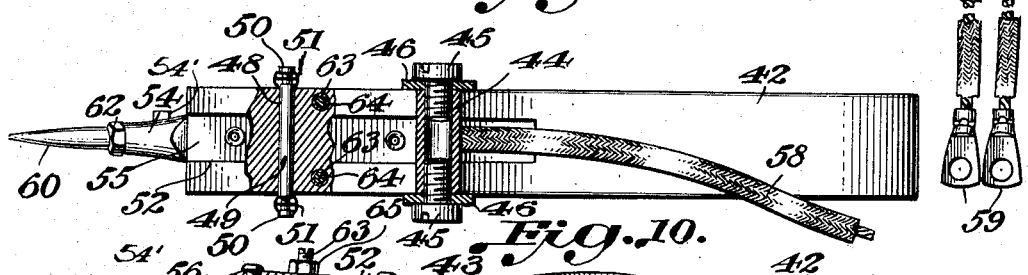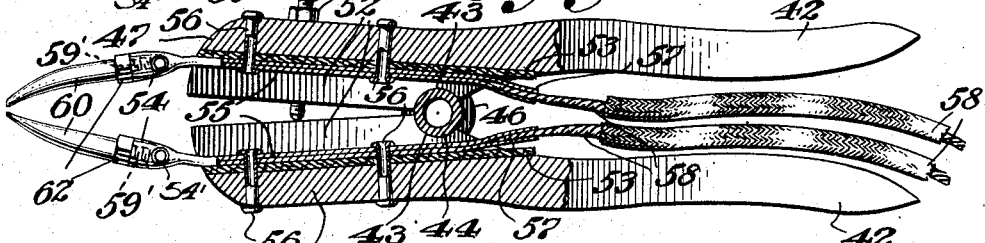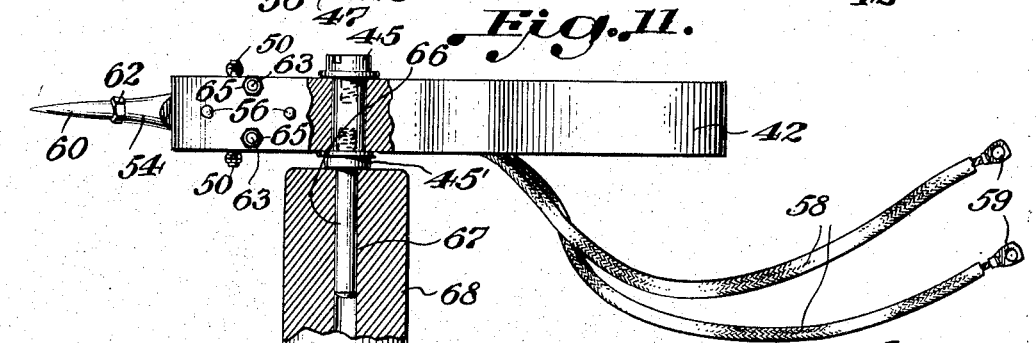

Patented Sept. 14, 1948

2,449,521

UNITED STATES PATENT OFFICE 2,449,521

SOLDERING OR WELDING IMPLEMENT

Samuel W. Warner, Newark, N. J., assignor of one-half to Herman Bernstein and one-half to Joe Sodowick, Newark, N. J.

Application September 26, 1945, Serial No. 618,690

9 Claims. (Cl. 219—26)

My invention relates to an implement which may be used in soldering, spot soldering, general welding and spot welding.

An important object of the invention is to provide an implement of the above mentioned character which is slender and may be conveniently manipulated in ordinarily inaccessible spaces for soldering or welding small parts.

A further object of the invention is to provide an implement of the above mentioned character which is in the nature of a pair of tweezers and can be manipulated like an ordinary pair of tweezers.

A further object of the invention is to provide means for directly clamping the wires to the arms of the implement, eliminating the use of soldering or separate attaching means.

A further object of the invention is to provide means for detachably securing terminals to the arms of the implement, whereby terminals of different shapes may be employed.

A further object of the invention is to provide terminals which are nickel-chrome plated so that the solder will not adhere to the same.

A further object of the invention is to provide a device of the above mentioned character embodying blades or arms which are biased closed, and are spread when moved into engagement with the work to be soldered or welded.

A further object of the invention is to provide heat insulating means for the arms of the device.

A further object of the invention is to provide an implement providing ample heat insulation for hard and soft welding.

A further object of the invention is to provide an implement, the handles of which may be readily separated.

A further object of the invention is to provide adjustable means to regulate the closing action of the jaws of the handle.

Other objects and advantages of the invention will be apparent during the course of the following description.

In the accompanying drawings forming a part of this application, and in which like numerals are employed to designate like parts throughout the same, Figure 1 is a perspective view of the soldering or welding implement embodying my invention, Figure 2 is a plan view of the same, parts in central longitudinal section, Figure 3 is an enlarged central longitudinal section through the arms or blades and connecting means, Figure 4 is a perspective view of the device, held in the hands of the operator like a pencil, Figure 5 is a side elevation, parts broken away and parts in section, of one arm or blade of the device, showing a different shape terminal, Figure 6 is a plan view, parts in central longitudinal section, of a modified form of soldering or welding implement, wherein the blades are biased closed, Figure 7 is a side elevation of the same, Figure 8 is a side elevation of a soldering or welding implement embodying a second modification of the invention, Figure 9 is a plan view of the same, parts in section, Figure 10 is a side elevation of the same, parts in central longitudinal section, and Figure 11 is a side elevation of a further modification of the invention, parts in vertical section.

Attention being called first to Figures 1 to 5, inclusive, an implement is shown comprising tubular arms 10, formed of copper or any other suitable metal or metal alloy. These arms 10 are biased open. The tubular arms are squeezed or collapsed near and spaced from their rear ends, providing flat attaching portions 11, which are suitably resilient. Rearwardly of these flat portions, the tubular arms 10 are not collapsed and provide tubular binding sockets 12.

Means are provided to rigidly connect the flat portions 11 and to thoroughly electrically insulate the same. This means comprises a strip or block of fiber 13, disposed between the flat portions 11. Disposed upon the outer faces of the flat portions 11, adjacent to and in alignment with the block 13, are electrical insulating strips 14, preferably formed of fiber. The flat portions 11, block 13, and strips 14 are provided with aligned circular openings 15 for receiving insulating tubes 16, preferably formed of "Bakelite." The flat portions 11, block 13 and strips 14 are all rigidly secured together by transverse attaching elements 16, shown as rivets, although other attaching means may be employed, such as pins, bolts or screws. The rivets serve to rigidly hold the parts together and are entirely insulated from the arms 10 by passing through the tubes 16. The tubular binding sockets 12 extend rearwardly beyond the insulating block 13 and associated elements and receive the ends of lead wires 17, which are securely clamped within the binding sockets 12 by squeezing the binding sockets to the lead wires. These lead wires have insulation 18, formed of glass or rubber, and both lead wires are enclosed within an insulating sleeve 19. The lead wires 17 extend rearwardly and are suitably connected with terminals 20, for attachment to the terminals of the usual transformer. The insulating sleeve 19 and elements carried therein are flexible, and the insulating sleeve 19 terminates near binding sockets 12.

When the implement is used in soldering or spot soldering, the arms 10 may heat sufficiently to cause discomfort to the hand. I therefore contemplate applying heat insulating elements or bridges 21 to the arms 10. These insulating bridges may be formed of "Bakelite" or the like and are arranged upon the opposite outer sides of the arms and secured thereto by screws 22 or the like. These bridges have legs 23, affording air spaces 24, between the bridges and the arms 10.

The numeral 25 designates removable electrodes which may be circular in cross section and taper forwardly to a point. These electrodes may be formed of copper or any other suitable metal or metal alloy. At their rear ends, these electrodes 25 have reduced screw threaded extensions 26, integral therewith for engagement within the screw threaded forward ends of the tubular arms 10. These screw threaded extensions 26 carry lock nuts 27, to retain the electrodes upon the arms against accidental displacement. The electrodes 25 may be formed of copper, as stated, and I may nickel-chrome plate these electrodes, as shown at 28, so that the solder will not adhere to the electrodes. Any flux which adheres to the electrodes will be dissolved in the usual bath.

As shown in Figure 5, each tubular arm may carry an electrode 29, of smaller diameter than the electrode 25 and cylindrical, and having its forward end rounded, as shown at 30. This electrode may be nickel-chrome plated, as shown at 31. The rear end of this electrode is screw threaded, as shown at 32, for engagement within the screw threaded end of the tubular arm 10 and this electrode carries a lock nut 33. The overall length of the arms 10 and electrodes 25 are preferably 5½ to 6 inches, while the tubular arms preferably have a diameter of substantially ¼ inch. The electrodes 25, at their large end, are preferably slightly smaller in diameter than the arms and have a diameter of about 3/16 inch. The size and shape of the arms 10 permit the implement to be held in the hand like a lead pencil when writing, so it can be held between the thumb and the third or longest finger. This renders it particularly convenient to manipulate the implement. The implement can also be held in the hand in a different manner, as is obvious. The parts to be soldered, such as wires, are brought between the forward ends of the electrodes 25, and the arms are then pressed inwardly so that these parts are securely pressed together during the soldering period. The solder is brought into contact with the wires and the current is turned on and heats the wires by virtue of the resistance of the wires, and the solder is melted. The arms 10 are rigid, but the flat portions 11 are resilient and permit of the arms being moved inwardly. After the soldering is completed, the current is turned off. The implement may be also used in welding. The parts to be welded are brought between the outer ends of the electrodes 25 and are clamped together by moving the arms 10 inwardly. The current is then turned on to effect the welding. The voltage supplied to the arms 10 is low, ordinarily one-half volt and usually 10 amperes being used. The spot welding is usually effected in a fraction of a cycle. The implement is very useful in spot soldering and spot welding of parts in radio equipment, such as in welding a terminal to a grid, or other small parts. Since the electrodes are detachably connected with the tubular arms, the electrodes may be removed, and other electrodes of different shapes applied to the arms, depending upon the character of the work.

In Figure 6, I have shown a modified form of implement for soldering or spot welding. This implement is in the nature of a pair of tweezers and comprises blades 34, which are preferably formed of copper, although they may be formed of any other suitable metal or metal alloy. The blades 34 are preferably 4½ to 6 inches long, although this length may be varied. The blades have a width corresponding roughly to the width of an ordinary lead pencil and are about 3/16 to ¼ inch wide at their maximum width, and these blades taper forwardly. This enables the implement to be held in the hand like an ordinary lead pencil. The blades 34 are biased closed and are provided at their forward ends with beveled faces 35, converging rearwardly. The blades may have a heat insulating coating 35'.

Near their longitudinal centers, the blades are rigidly connected. The connecting means comprises an insulating block 36, formed of fiber, and outer insulating strips 37, formed of fiber. The blades 34, strips 37 and block 36 have aligned openings 38, for receiving an insulating tube 38' formed of "Bakelite," in turn receiving a connecting element, such as a rivet 39', which rigidly connects the blades 34, but the rivet is thoroughly insulated from the plates by passing through the tube 38'.

Secured to the rear end of the plates 34 by solder or the like are metal terminals 39, having tubular sockets 40 for receiving lead wires 41, which are clamped within the tubular sockets by squeezing the tubular sockets to the lead wires. These lead wires carry insulating means, as shown and described in connection with the first form of the invention, and also carry terminals at their rear ends.

The operation of the implement, shown in Figure 6, for spot welding, is as follows.

The blades 34 are biased closed and are substantially parallel when closed. The fixed elements to be spot welded, such as wires, are clamped together by moving the blades longitudinally toward the wires so that the beveled faces 35 engage these wires. These wires may pass between the inner flat faces of the blades 34 or may not pass beyond the rear converging ends of the faces 35. The welding current is then turned on and the weld effected almost instantly. The voltage applied to the tweezer blades 34 is ordinarily ½ volt and usually 10 amperes. The welding period is usually a fraction of a cycle. The tweezer implement may also be used in spot soldering. The elements to be soldered, such as the fixed wires, are clamped together by bringing the beveled faces 35 into engagement therewith. The solder is held in contact with the wires, and the current is turned on. The current heats the wires by virtue of the resistance of the wires, and the solder is melted. When the current is turned off, the solder cools and the beveled faces 35 release the soldered wire.

In Figures 8 to 10, inclusive, I have shown a second form of implement for soldering or welding. This implement may be used for hard or soft soldering. This implement comprises handles 42, preferably formed of wood. These handles are arranged in opposed relation and do not cross. These handles are provided between their ends with circularly curved transverse interior recesses 43, open at their inner sides and receiving a sleeve 44, receiving screws 45 in its opposite ends, serving to attach washers 46 to the sleeve. The handles extend forwardly beyond the sleeve or pivot 44 and provide jaws 47. These jaws have transverse openings 48, receiving pins 49, provided at their ends with reduced headed extensions 50, having detachable connection with the hooked ends of retractile coil springs 51. These springs cause the jaws 47 to be biased closed and also retain the handles upon the pivot or sleeve 44.

The jaws 47 have longitudinal interior recesses 52 receiving strips of asbestos 53 or other heat insulating material. The numeral 54 designates tubes, preferably formed of copper, and the intermediate portions of these tubes are pressed or collapsed to provide flat portions 55. These flat portions engage the asbestos strips 53 and are rigidly attached to the jaws 47 by rivets 56, as shown. The rear ends 57 of these tubes are not collapsed before lead wires 58 are inserted therein, after which these rear ends are compressed for clamping the lead wires therein. The tubes 54 form elements, having tubular sockets at their forward and rear ends. The lead wires have terminals 59 for connection with a suitable source of soldering or welding current. The forward ends of the tubes 54 are screw threaded for receiving the reduced ends 59 of electrodes 60, corresponding to the electrodes 25, and these electrodes 60 are nickel-chrome plated, as indicated at 61. The electrodes carry lock nuts 62. 54' are inlets for water or hydrogen cooling. The jaws 47 are biased closed, as stated, and in order that the electrodes 61 may not contact with each other when there is no work between them, adjustable stops are provided to limit the inward movement of the jaws and electrodes. These adjustable stops comprise screws 63, having screw threaded engagement with the metal sleeves 64, extending transversely through the jaws 47 and rigidly mounted therein. The screws carry lock nuts 65. The handles 42 are spaced apart a sufficient distance for the passage of the wires 58, as shown.

The operation of the implement shown in Figures 8 to 10 is as follows:

The parts to be soldered, either hard or soft soldering, are brought into close relation to the electrodes 60 while the electrodes are connected with the source of current. The handles 42 are drawn together and the electrodes 60 spread and the work is passed between the free ends of the electrodes 60. By gradually releasing the handles 42, the springs 51 press the terminals 60 against the parts to be soldered. These parts are heated and the solder is brought into engagement with the heated parts. The parts are heated for any desired length of time for effecting hard or soft soldering. The jaws 60 may be of any suitable shape, depending upon the work to be done.

In Figure 11, a further modification of the invention is shown. The handles 42 are arranged to swing in a horizontal plane and a modified form of screw 45' is substituted for one of the screws 45, and this screw 45' carries a cylindrical extension 66, rotatable with an opening 67 of a vertical stand 68. All other parts of the implement remain identical with the implement shown and described in Figures 8 to 10 inclusive.

The operation of the device shown in Figure 11 is similar to that shown in Figures 8 to 10. Since the handles 42 are mounted upon the stand 68, the implement is not bodily shiftable as readily as that shown in Figures 8 to 10, where the implement is supported by grasping the handles 42. The work is brought in proximity to the terminals 60, Figure 4, and the soldering is effected in the manner stated in connection with Figures 8 to 10. All other parts of the implement in Figure 11 are identical with that shown in Figures 8 to 10.

The implements shown in Figures 8 to 11 may also be used for spot welding, as described in connection with the first form of the invention. The advantage of the construction shown in Figures 8 to 11 is that greater heat insulation is provided, so that the implement may be conveniently manipulated in hard soldering, where considerable heat is present.

All of the implements may be used for welding copper or any other metal and may be used for butt or lap welding.

It is to be understood that the forms of my invention herewith shown and described are to be taken as preferred examples of the same, and that various changes in the shape, size and arrangement of parts may be resorted to without departing from the spirit of my invention or the scope of the subjoined claims.

Having thus described my invention, what I claim is:

1. An implement of a shape and size so that it may be held in the hand like a pencil in writing, said implement being employed in soldering or welding, said implement comprising opposed tubular arms having flattened portions arranged near and spaced from their rear ends, the rear ends of the tubular arms forming tubular sockets for receiving the ends of wires connected with the opposite poles of a source of current, the tubular sockets being squeezed upon the wires for clamping connection therewith, means rigidly connecting the flattened portions and insulating the same, and electrodes having portions removably mounted within the forward ends of the tubular arms.

2. An implement to be employed in soldering or welding, comprising opposed tubular arms having flattened portions between their ends, the forward and rear ends of the tubular arms forming forward and rear tubular sockets, the rear tubular sockets being adapted to receive the ends of wires connected with the opposite poles of a source of current, means connecting the flattened portions and insulating the same, and electrodes having parts removably mounted within the forward tubular sockets.

3. An implement for soldering or welding, comprising opposed tubular arms formed of copper and having intermediate flattened resilient portions arranged between the ends of the arms, the forward and rear ends of the tubular arms forming forward and rear tubular sockets, the forward tubular sockets being internally screw threaded, means connecting the flattened portions and insulating the same, the flattened portions causing the tubular arms to be biased open, the rear tubular sockets being adapted to receive the ends of wires, and electrodes having screw threaded extensions to engage within the forward screw threaded sockets.

4. An implement for soldering or welding, comprising opposed tubular arms having flattened portions disposed rearwardly of the forward ends of the tubular arms, such forward ends forming forward tubular sockets which are internally threaded, means securing the flattened portions together and insulating the same, means for connecting wires with the rear ends of the arms, electrodes having screw threaded portions to engage within the screw threaded sockets, and lock nuts carried by the screw threaded portions to engage with the sockets.

5. An implement for soldering or welding, comprising metal tubes, said metal tubes having intermediate flattened portions and having tubular sockets at their forward and rear ends, means connecting the flattened portions and insulating them, electrodes having parts detachably engaging within the forward sockets, and wires extending into the rear sockets which are adapted to be squeezed upon the wires.

6. An implement for soldering or welding, comprising heat insulating handles having forward jaws, means pivotally connecting the handles between their ends, metal tubes having intermediate flattened portions and having tubular sockets at their forward and rear ends, means to secure the flattened portions to the jaws, terminals engaging within the forward tubular sockets, and wires engaging within the rear tubular sockets.

7. An implement for soldering or welding, comprising handles formed of heat insulating material and having jaws, said handles being arranged in opposed relation and not crossing, said jaws provided with interior longitudinal recesses, means to pivotally connect their handles between their ends, metal tubes having intermediate flattened portions and having tubular sockets at their forward and rear ends, the intermediate flattened portions being arranged within the recesses, means to attach the flattened portions to the jaws, electrodes engaging within the formed sockets, wires engaging within the rear sockets and held therein, and means to draw the jaws together.

8. An implement for soldering or welding, comprising handles formed of heat insulating material and having jaws provided with interior longitudinal recesses, said handles being arranged in opposed relation and not crossing, said handles having interior transverse recesses open at their inner sides, a transverse pivot element held within the transverse recesses, transverse pins extending through the jaws forwardly of the pivot, retractile coil springs mounted upon opposite sides of the jaws and detachably connected with the transverse pins, metal elements extending within the longitudinal recesses, means to attach the metal elements to the jaws, terminals carried by the forward ends of the metal elements and wires attached to the rear ends of the metal elements.

9. An implement for soldering or welding, comprising handles formed of heat insulating material provided upon their inner faces with longitudinal recesses, said handles being arranged in opposed relation and not crossing, said handles being provided near their forward ends with transverse recesses open at their inner sides, a pivot-sleeve arranged within the recesses and internally threaded, washers arranged at the ends of the pivot-sleeve, screws carrying the washers and engaging within the sleeve, one screw having an extension for supporting the pivot sleeve, transverse pins extending through the jaws forwardly of and near the pivot sleeve, retractile coil springs mounted upon opposite sides of the jaws and connected with the transverse pins, the springs serving to bias the jaws closed and to retain the pivot sleeve within the transverse recesses, an adjusting screw carried by one jaw and extending transversely thereof and engaging the opposite jaw to limit the closing movement of the jaws, metal elements extending longitudinally within the longitudinal recesses of the jaws and secured to the jaws, electrodes carried by the forward ends of the metal element, and wires attached to the rear ends of the metal elements.

SAMUEL W. WARNER.

REFERENCES CITED

The following references are of record in the file of this patent:

UNITED STATES PATENTS

| Number | Name | Date |
| --- | --- | --- |
| 1,037,030 | Lux | Apr. 8, 1912 |
| 1,142,306 | Clemens | Nov. 21, 1914 |
| 1,690,101 | Burns | Oct. 28, 1926 |
| 1,756,556 | Hollup | Apr. 29, 1930 |
| 1,869,448 | Woodring | Aug. 2, 1932 |
| 1,998,229 | Frederics | Apr. 16, 1935 |
| 2,139,499 | Howie | Dec. 6, 1938 |
| 2,146,854 | Schleif | Feb. 14, 1939 |
| 2,427,209 | Hagadorn | Sept. 9, 1947 |
| 2,429,039 | Warner | Oct. 14, 1947 |

FOREIGN PATENTS

| Number | Country | Date |
| --- | --- | --- |
| 541,524 | France | May 3, 1922 |
| 183,006 | Switzerland | June 2, 1936 |